(12) United States Patent
Van Gestel

(10) Patent No.: US 8,855,473 B2
(45) Date of Patent: Oct. 7, 2014

(54) APPARATUS FOR AND A METHOD OF STORING A REAL TIME STREAM OF DIGITAL INFORMATION SIGNALS

(71) Applicant: Koninklijke Philips Electronics N.V., Eindhoven (NL)

(72) Inventor: Wilhelmus J. Van Gestel, Heeze (NL)

(73) Assignee: Koninklijke Philps N.V., Eindhoven (NL)

( * ) Notice: Subject to any disclaimer, the term of this patent is extended or adjusted under 35 U.S.C. 154(b) by 0 days.

(21) Appl. No.: 13/783,670

(22) Filed: Mar. 4, 2013

(65) Prior Publication Data

US 2013/0177300 A1    Jul. 11, 2013

Related U.S. Application Data

(63) Continuation of application No. 10/549,371, filed as application No. PCT/IB2004/050241 on Mar. 12, 2004, now Pat. No. 8,412,019.

(30) Foreign Application Priority Data

Mar. 17, 2003    (EP) .................................... 03100667

(51) Int. Cl.
*H04N 5/92* (2006.01)
*G11B 27/034* (2006.01)
*G11B 20/00* (2006.01)
*H04N 9/79* (2006.01)
*G11B 20/10* (2006.01)

(52) U.S. Cl.
CPC ........ *H04N 9/79* (2013.01); *G11B 2020/10944* (2013.01); *G11B 27/034* (2013.01); *G11B 20/00086* (2013.01)
USPC ......................................................... 386/326

(58) Field of Classification Search
CPC ..................... G11B 27/105; G11B 2220/2541; H04N 5/77; H04N 13/0048; H04N 13/0055
See application file for complete search history.

(56) References Cited

U.S. PATENT DOCUMENTS 5,758,054 A * 5/1998 Katz et al. ........................ 714/22
6,131,161 A   10/2000 Linnartz
(Continued)

FOREIGN PATENT DOCUMENTS

| CN | 1228221 A | 9/1999 |
|---|---|---|
| JP | 2001285800 A | 10/2001 |
| WO | 0052693 | 9/2000 |

OTHER PUBLICATIONS

IEC 61883—Digital Interface for Consumer Electroic Audio/Video Equipment (Parts 1-7).

(Continued)

*Primary Examiner* — William C Vaughn, Jr.
*Assistant Examiner* — Daniel Tekle

(57) ABSTRACT

An apparatus for recording a substantially real time stream of digital information signals on a disc like record carrier has been proposed. The stream of information signals represents information arranged in a sequence of video frames, each video frame arranged in separate, consecutive data blocks comprised in separate, consecutive data packets. The apparatus comprises input means (1) for receiving the stream of digital signals, processing means (100) for processing the stream of digital information signals to obtain digital information signals and writing means (102) for writing the digital information signals into the units of recording on the disc like record carrier. The processing means (102) are adopted to detect the data blocks in the data packets and to allocate consecutive data blocks comprised in multiple data packets into consecutive logical units, a size of each logical unit corresponding to the predetermined size of the unit of recording. This apparatus is specifically suitable for recording digital video (DV) signals in a manner that preserves the format of original data as much as possible.

23 Claims, 6 Drawing Sheets

(56) References Cited

U.S. PATENT DOCUMENTS

| | | |
|---|---|---|
| 6,580,462 B2 | 6/2003 | Inoue |
| 6,609,176 B1 * | 8/2003 | Mizuno ........................ 711/114 |
| 6,826,181 B1 | 11/2004 | Higashida et al. |
| 6,886,068 B2 | 4/2005 | Tomita |
| 7,194,548 B1 | 3/2007 | Matsumi |
| 2001/0007568 A1 | 7/2001 | Morris |
| 2001/0036355 A1 | 11/2001 | Kelly et al. |
| 2002/0131508 A1 | 9/2002 | Otaka |

OTHER PUBLICATIONS

"Proposed SMPTE Standard for Television-Data Structure for DV-Based Audio Data and Compressed Video-25 and 50 MS/S" SMPTE Journal, SMPTE, Inc. Scardsale, New York, US, Vol. 108, No. 5, May 1999, p. 308-330, XP000831859, ISSN:0036-1682.

* cited by examiner

APPARATUS FOR AND A METHOD OF STORING A REAL TIME STREAM OF DIGITAL INFORMATION SIGNALS

The invention relates to an apparatus for recording a substantially real time stream of digital video information signals on a disc like record carrier, the stream of digital video information signals representing information arranged in a sequence of video frames, each video frame arranged in separate, consecutive data blocks transmitted in data packets, the data blocks comprising data blocks headers, the disc like record carrier having units of recording of a predetermined size larger than a size of the data packets, the apparatus comprising:

input means for receiving the stream of digital video information signals;

processing means for processing the stream of digital video information signals to obtain recordable information signals representing logical units of information;

writing means for writing the logical units of information into the units of recording on the disc like record carrier.

The invention further relates to an apparatus for reproducing a substantially real time stream of digital video information signals from a disc like record carrier, the stream of digital video information signals representing information arranged in a sequence of video frames, each video frame arranged in separate, consecutive data blocks, the disc like record carrier having units of recording of a predetermined size, the apparatus comprising:

input means for reading information signals representing logical units of information from the units of recording on the disc like record carrier, a size of each logical unit of information corresponding to the predetermined size of the unit of recording;

processing means for processing the information signals to obtain the stream of digital video information signals.

The invention also relates to a method of storing a substantially real time stream of digital video information signals on a disc like record carrier, the stream of digital video information signals representing information arranged in a sequence of video frames, each video frame arranged in separate, consecutive data blocks transmitted in data packets, the data blocks comprising data blocks headers, the disc like record carrier having units of recording of a predetermined size larger than a size of the data packets, the method comprising steps of:

receiving the stream of digital video information signals;

detecting the data packets in the stream of digital video information signals.

Further, the invention relates to a record carrier provided with the recordable information signals recorded on it by the apparatus for recording.

An embodiment of the apparatus for recording a substantially real time stream of digital video information signals described in the opening paragraph is known from the published international patent application WO 00/52693. It is capable of recording so-called MPEG Transport Streams on a disc like record carrier in a manner more efficient than in case of so-called Program Streams. Transport Streams contain data packets and corresponding time stamps representing a time of arrival of the data packets in a stream of video information signals. Transport Streams can be used for recording Standard Definition TV (SDTV) analog input signals (525/60 TV systems and 625/50 TV systems) and for recording SDTV digital input signals, like Digital Video (DV), or digital broadcast streams. Before recording, the analog signals are encoded by the MPEG encoder. In case of digital signals, they have to be first decoded before encoded again to an MPEG Transport Stream. This is disadvantageous in that some characteristic (auxiliary) data present in the digital signals may be lost while transcoding signals to the MPEG Transport Stream. It may also influence a quality of data. In particular, changing a format of original DV signals may make them not suitable for editing with dedicated software.

It is an object of the invention to overcome the above mentioned disadvantages and more generally to solve the problem of storing digital video information signals on a disc like record carrier.

This object is achieved, according to a first aspect of the invention, by an apparatus for recording of the type described in the opening paragraph, characterized in that the processing means are adapted to detect the data blocks in the data packets, to separate the data blocks from the data packets, to generate allocation information using information comprised in the data blocks headers and to allocate consecutive data blocks comprised in multiple data packets to consecutive logical units of information according to the allocation information, a size of each logical unit of information corresponding to the predetermined size of the unit of recording.

The apparatus according to the invention is advantageous in that it is capable of storing digital video information signals on a disc like record carrier in an efficient manner, which does not require transcoding to a different format—the original information such as auxiliary data is preserved.

In an embodiment of the apparatus for recording, the processing means are adapted to allocate a first data block representing a beginning of a video frame comprised in the sequence of video frames to a predefined location in a logical unit of information. This embodiment is advantageous in that it simplifies storage, retrieval and editing of the digital information signals. This is important specifically for cases in which the sequence of video frames undergoes editing operations, such as deletion of a part of the sequence.

In a further embodiment of the apparatus for recording, the processing means are adapted to allocate an integer number of the data blocks into a logical unit of information. This is advantageous in that it simplifies a structure of data comprised in a logical unit of information; all logical units may have the same structure.

It is advantageous, if the processing means are adapted to provide logical units of information with logical unit headers. The logical unit headers can be used for storing information concerning a structure of data comprised in the logical units.

A further embodiment of the apparatus for recording is characterized in that the processing means are adapted to provide the logical unit headers with copy protection information. This embodiment is advantageous in that the digital information signals stored on the record carrier can be protected against unauthorized copying.

In another embodiment of the apparatus for recording the processing means are adapted to remove data blocks headers from the data blocks and to provide the logical unit headers with address information for addressing the data blocks in the logical units of information. This makes it possible to simplify a structure of digital video information signals stored on the record carrier and to decrease a data rate.

According to a second aspect of the invention an apparatus for reproducing of the type described in the opening paragraph is provided, wherein the processing means are adapted to recover consecutive data blocks comprised in consecutive logical units of information and to form the sequence of video frames.

According to a third aspect of the invention a method of the type described in the opening paragraph is provided comprising steps of:
detecting the data blocks in the data packets;
separating the data blocks from the data packets;
generating allocation information using information comprised in the data blocks headers;
allocating consecutive data blocks comprised in multiple data packets to consecutive logical units of information according to the allocation information, a size of each logical unit of information corresponding to the predetermined size of the unit of recording.

According to a forth aspect of the invention a record carrier of the type described in the opening paragraph is provided, on which the recordable information signals are recorded by the method as described in relation to the third aspect of the invention.

These and other aspects of the invention will be further elucidated and described with reference to the drawings, in which.

Figure 1:
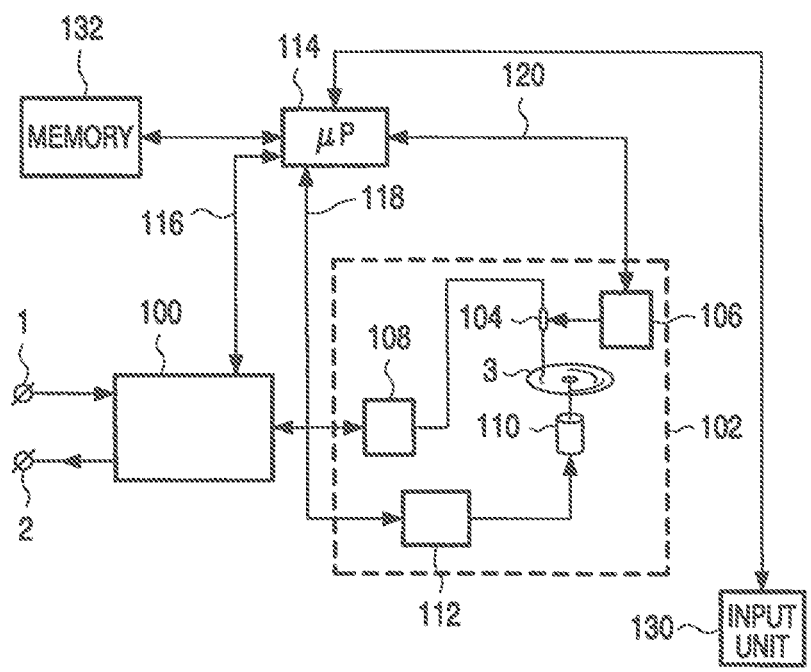
FIG. 1 shows an embodiment of the apparatus for recording a stream of digital video information signals, in accordance with the invention.

FIG. 1 shows an embodiment of the apparatus for recording a substantially real time stream of digital video information signals, in accordance with the invention. The apparatus comprises an input terminal 1 for receiving the stream of digital video information signals and a processing unit 100 for processing the stream of digital video information signals to obtain recordable information signals representing logical units of information. The signals processing unit 100 receives the digital video information signals via the input terminal 1 and processes these signals for recording on a record carrier 3. Further, a read/write unit 102 is available. The read/write unit 102 comprises a read/write head 104, which is in the present example an optical read/write head for reading/writing the recordable information signals into/from the units of recording on the record carrier 3. Further, positioning means 106 are present for positioning the head 104 in a radial direction across the record carrier 3. A read/write amplifier 108 is present in order to amplify the signal to be recorded and amplifying the signal read from the record carrier 3. A motor 110 is available for rotating the record carrier 3 in response to a motor control signal supplied by a motor control signal generator unit 112. A microprocessor 114 is present for controlling all the circuits via control lines 116, 118 and 120. The apparatus for can provided with an input unit 130 for receiving commands from a user (e.g. a command to start recording of digital information signals).

Figure 2:
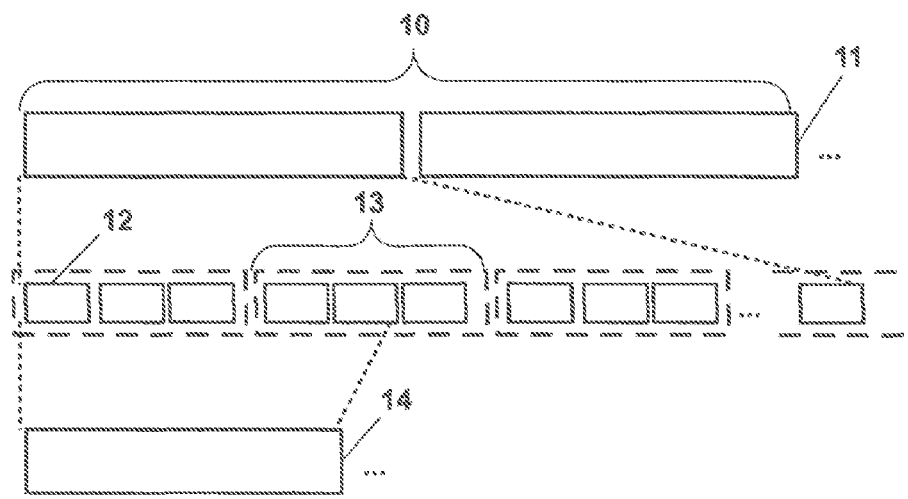
FIG. 2 shows an example of a structure of the information represented by the stream of digital video information signals and an example of allocation of data blocks, in accordance with the invention.

The signals processing unit 100 is further adapted to process the stream of digital information signals representing information arranged in a sequence of video frames 10 as shown by an example in FIG. 2. In this example a video frame 11 consists of a number of consecutive data blocks 12 comprising data blocks headers. Data blocks 12 are transmitted to the processing unit 100 in data packets 13. The processing unit 100 is capable of identifying data blocks 12 comprised in multiple data packets 13. Further, the processing unit 100 is capable of grouping consecutive data blocks 12 and allocating them into consecutive logical units 14. For this purpose, the processing unit 100 can use information comprised in the data blocks headers. Each logical unit 14 has a size corresponding to the predetermined size of the unit of recording on the record carrier 3. The processing unit 100 generates recordable information signals representing logical units 14; these signals can be written to the record carrier 3 by the read/write unit 102. The allocation performed by the processing unit 100 preserves the format of the sequence of video frames 10, maintaining both, the order of video frames within the sequence 10 and the order of data blocks 12 within a video frame 11. It also preserves data comprised in data blocks 12, e.g. auxiliary data.

Figure 3:
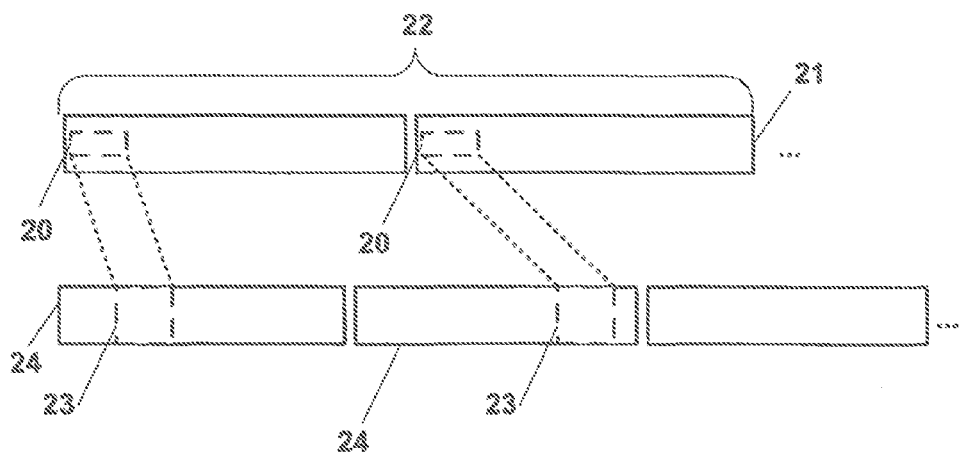
FIG. 3 shows another example of allocation of data blocks, in accordance with the invention.

The processing unit 100 can be adapted to allocate a first data block 20 representing a beginning of a video frame 21 comprised in the sequence of video frames 22 to a predefined location 23 in a logical unit 24, as illustrated in FIG. 3. This ensures that the video frame starts at a known location within a logical unit.

The processing unit 100 can be further adapted to perform editing of the sequence of video frames by e.g. removing a part (some frames) of the sequence or dividing the sequence into plurality of sequences. Use of predefined locations 23 within a logical unit 24 for allocating the sequence of video frames guarantees that starting points of edited or new sequences are always known.

Predefined locations 23 may be defined depending on circumstances such as e.g. a format of the digital video information signals to be recorded.

Figure 4:
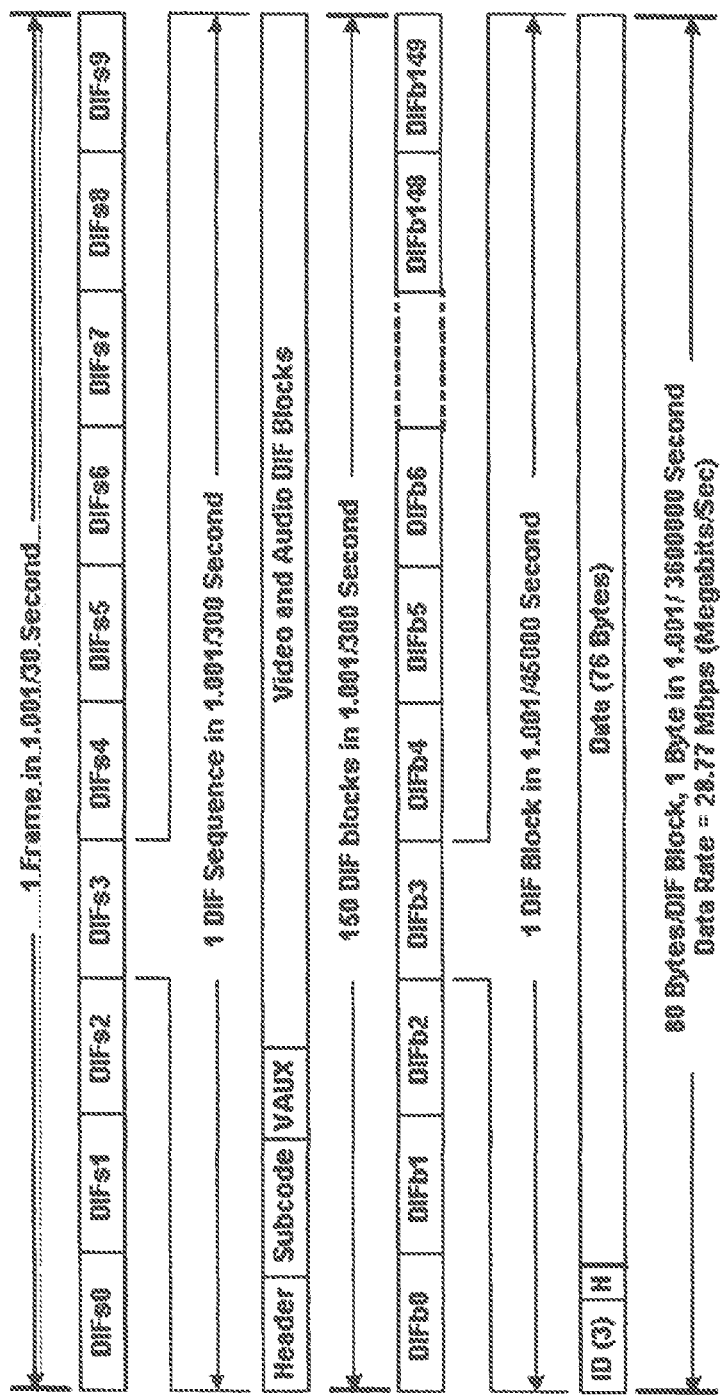
FIG. 4 shows organization of data blocks within video frames as defined for the Digital Interface Format (DIF).

The Digital Interface Format (DIF), for example, is widely used as the format for transmitting DV signals between different devices such as a digital camcorder and a video recorder. This format is defined in the publication "*IEC 61883—Digital Interface for Consumer Electronic Audio/Video Equipment*". The stream of DV information signals represents a sequence of video data comprising video frames, wherein each video frame represents a complete video picture, audio information and additional data. In case of SDTV signals, one frame consists of 10 or 12 so-called DIF sequences, for NTSC or PAL system, respectively. Each DIF sequence contains 150 so-called DIF blocks of 80 bytes each. 144 DIF blocks (out of 150) comprise compressed video data (135 blocks) and audio data (9 blocks). The remaining six DIF blocks are devoted to sequence header (1 block), subcode (2 blocks) and video auxiliary (VAUX) data (3 blocks). VAUX data includes recording date and time, lens aperture, shutter speed, color balance and other video camera setting data. FIG. 4 shows organization of DIF blocks within video frames. Each DIF block contains 3-bytes of identification data (ID), hereinafter also called block header, 1-byte block sub-header (H) and 76-bytes of payload. With a refresh rate of 29.97 frames/second for NTSC system, the stream of digital information signals, according to the format shown in FIG. 4, has a data rate of 28.77 Mbps.

Another embodiment of the apparatus for recording the stream of digital information signals according to the invention is realized by adapting the processing unit 100 to process a stream of digital video signals complying with the DIF standard.

The size of a video frame according to the DIF standard is 120000 bytes or 144000 bytes for NTSC or PAL system, respectively. The processing unit 100 can be adapted to use logical units of 2048 bytes and to allocate a first data block 20 representing a beginning of a video frame to a location which starts at a position being multiple of 64-bytes (for NTSC system) or 128-bytes (for PAL system) in a logical unit. It simplifies significantly localization of any video frame in the sequence of video data recorded on the record carrier. Also, it simplifies editing operations performed on the sequence and ensures that any sequence of video frames starts/ends at a position being multiple of 64-bytes (for NTSC system) or 128-bytes (for PAL system) in a logical unit.

Yet another embodiment of the apparatus for recording the stream of digital video information signals can be realized by adapting the processing unit 100 to allocate an integer number of the data blocks into a logical unit. This is a way to ensure, for example, that each data block is comprised in only one logical unit or, in other words, no data block extends from one to another logical unit. This is illustrated by an example of a logical unit shown in FIG. 5. The logical unit 30 has a size of 2048 bytes and can be used to map 25 complete DIF blocks 31 each of 80 bytes. In this case, the resulting data rate is about 29.5 Mbps for NTSC video signals.

The processing unit 100 can be adapted to "fill" the remaining bytes (in this particular example, 48 bytes) with zeros or to use those bytes for carrying additional information. For example, a logical unit 30 can be provided with a logical unit header 32, which may contain a specific information concerning digital video information signals. More specifically, the header 32 may comprise copy protection information, e.g. in a form of 2-bits flag, which can be used to prevent unauthorized copying of data stored on the record carrier. Further, the processing unit 100 can be modified to provide logical unit headers 32 with address information, e.g. for addressing contents of logical units. For example, in case of DIF blocks, 3-bytes block headers (ID in FIG. 4) can be removed by the processing unit 100 during allocation of data blocks into logical units. Instead, simple address information comprised in logical unit header 32 may be provided for addressing data blocks.

Figure 6:
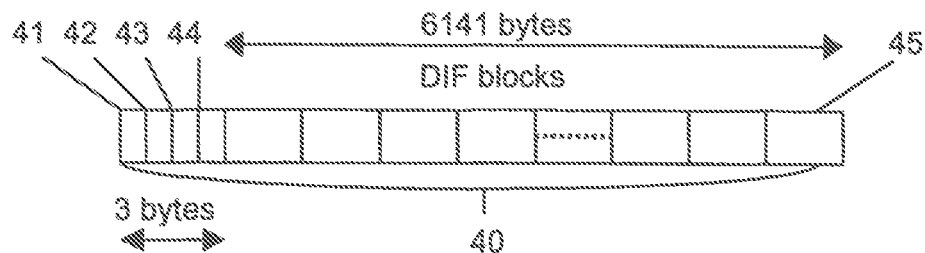
FIG. 6 shows another example of allocation of data blocks within logical units, in accordance with the invention.

DIF frames have fixed structure and size of 120000 bytes (NTSC frames) or 144000 bytes (PAL frames). The processing unit 100 can be adapted to make use of this feature and to allocate DIF blocks comprised a sequence of DIF frames in a manner that reduces data rate. For example, the processing unit 100 can allocate data blocks into so-called aligned units, each comprising three consecutive logical units of 2048 bytes. FIG. 6 shows an example of such a structure. The first 3-bytes (header) of each aligned unit 40 contain: 2-bits 41 for copy protection, 4-bits 42 for the DIF sequence number from the first byte of payload, 13-bits 43 for the start location of a new DIF sequence, if a new DIF sequence starts in a particular aligned unit and 5-bits 44 for reserve. Redundant information is removed from DIF blocks, so only 77-bytes long DIF blocks 45, i.e. blocks without 3-bytes block headers, are mapped into 6141 bytes of aligned units. This reduces data rate to about 27.7 Mbps (for NTSC system).

The specific structure of logical units 14, 24, 30, 40, as described in reference to operations performed by different embodiments of the apparatus for recording the stream of digital video information signals, define a format of storing the digital video information signals on the record carrier 3.

Figure 7:
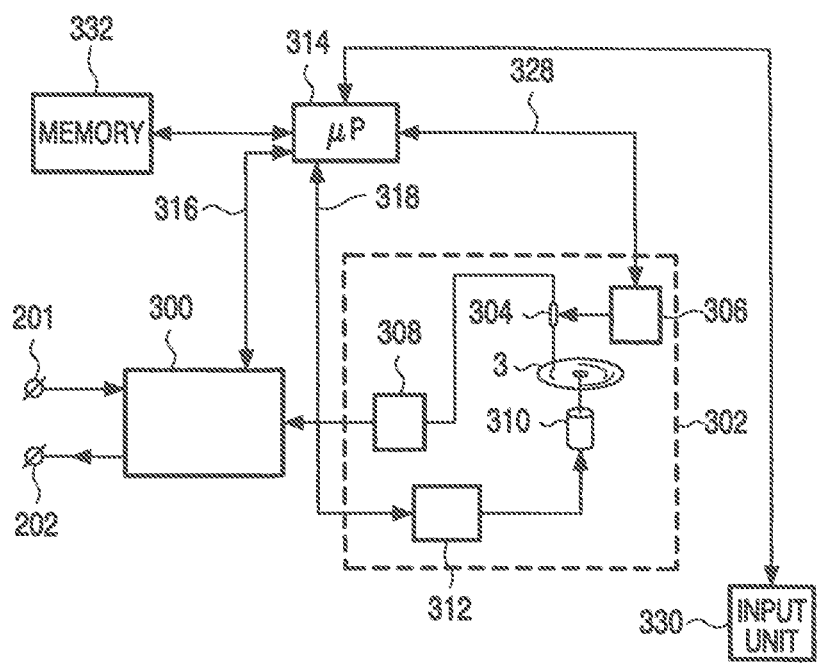
FIG. 7 shows an embodiment of the apparatus for reproducing a stream of digital video information signals, in accordance with the invention.

FIG. 7 shows an embodiment of the apparatus for reproducing a substantially real time stream of digital video information signals from a disc like record carrier 3, in accordance with the invention. The apparatus comprises a read unit 302, a signals processing unit 300 and an output terminal 202 for outputting the stream of digital video information signals. The read unit 302 comprises a read head 304, which is in the present example an optical read head for reading information signals representing logical units of information from the record carrier 3, where logical units corresponds to units of recording on the record carrier 3. The signals processing unit 300 receives information signals from a read unit 302 and processes information signals to obtain the stream of digital video information signals. Further, positioning means 306 are present for positioning the head 304 in a radial direction across the record carrier 3. A read amplifier 308 is present in order to amplify the signal read from the record carrier 3. A motor 310 is available for rotating the record carrier 3 in response to a motor control signal supplied by a motor control signal generator unit 312. A microprocessor 314 is present for controlling all the circuits via control lines 316, 318 and 320. The stream of digital video information signals can be outputted to another apparatus (e.g. a television set) or to another processing unit not shown in the figure.

The apparatus can be further provided with an input unit 330 for receiving commands from a user. In case of digital information signals representing video data, such commands can be in a form of different playback commands.

The signals processing unit 300 is further adapted to recover consecutive data blocks 12 comprised in consecutive logical units 14 and to form a sequence of video frames 10 as shown by an example in FIG. 2. In this example a video frame 11 consists of a number of consecutive data blocks 12. The processing unit 300 can be adapted to generate the stream of digital video information signals for transmission in multiple data packets 13. The processing unit 300 can use data blocks headers for the purpose of recovering the data blocks from the logical units.

The processing unit 300 can be adapted to be capable of recovering a first data block 20 representing a beginning of a video frame 21 comprised in the sequence of video frames 22, starting at a predefined location 23 in a logical unit 24, as illustrated in FIG. 3.

Predefined locations 23 may be defined depending on circumstances such as e.g. a format of the digital information signals to be reproduced.

Another embodiment of the apparatus for reproducing the stream of digital information signals according to the invention is realized by adapting the processing unit 300 to process a stream of digital video signals complying with the DIF standard, as was explained in reference to FIG. 4.

The processing unit 300 can be adapted to use logical units of 2048 bytes and to recover a first data block 20 representing a beginning of a video frame from a location which starts at a position being multiple of 64-bytes (for NTSC system) or 128-bytes (for PAL system) in a logical unit. It simplifies significantly localization of any video frame in the sequence of video data recorded on the record carrier. Also, it simplifies editing operations performed on the sequence and ensures that any sequence of video frames starts/ends at a position being multiple of 64-bytes (for NTSC system) or 128-bytes (for PAL system) in a logical unit.

Yet another embodiment of the apparatus for reproducing the stream of digital information signals can be realized by adapting the processing unit 300 to recover an integer number of the data blocks from a logical unit. This is illustrated by an example of a logical unit shown in FIG. 5. The logical unit 30 has a size of 2048 bytes and can be used to map 25 complete DIF blocks 31 each of 80 bytes.

The processing unit 300 can be adapted to recover additional information from the remaining bytes (in this particular example, 48 bytes). For example, a logical unit 30 can be provided with a logical unit header 32, which may contain a specific information concerning digital information signals. More specifically, the header 32 may comprise copy protection information 33, e.g. in a form of 2-bits flag, which can be used to prevent unauthorized reproduction or copying of data stored on the record carrier.

Further, the processing unit 300 can be modified to recover logical unit headers 32 with address information, e.g. for addressing contents of logical units.

The processing unit 300 can be adapted to recover data blocks from so-called aligned units, each comprising three consecutive logical units of 2048 bytes as was explained in reference to FIG. 6. Further, the processing unit 300 can be modified to provide data blocks with data blocks headers (see FIG. 4).

Figure 8:
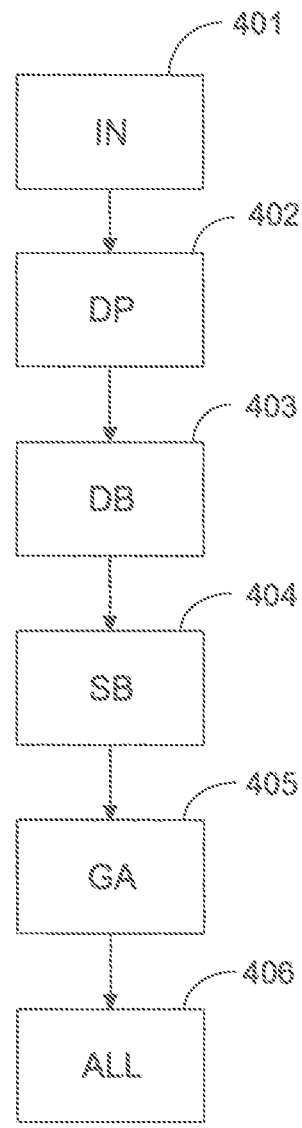
FIG. 8 shows an embodiment of a method of storing a stream of digital video information signals on a disc like record carrier, in accordance with the invention.

FIG. 8 shows an embodiment of a method of storing a substantially real time stream of digital video information signals on a disc like record carrier, in accordance with the invention. The stream of digital video information signals represents information arranged in a sequence of video frames, each video frame arranged in separate, consecutive data blocks transmitted in data packets, as was explained in reference to FIG. 2. In step 401 the stream of digital information signals is received. The data packets in the stream of digital information signals are detected in step 402. Furthermore, the data blocks in the data packets are detected in the next step 403. Next, the data blocks are separated from the data packets in step 404. In the next step 405, allocation information is generated to be used for allocating data blocks in logical units. Information comprised in data blocks headers can be used for this purpose. The steps 404 and 405 can be interchanged. Finally, consecutive data blocks comprised in multiple data packets are allocated into consecutive logical units according to the allocation information, in step 406. A size of each logical unit corresponds to a predetermined size of a unit of recording on the record carrier, which size is larger than a size of the data packets.

In an embodiment of the method of storing the stream of digital video information signals, step 406 is modified so a first data block 20 representing a beginning of a video frame 21 comprised in the sequence of video frames 22 is allocated to a predefined location 23 in a logical unit 24, as illustrated in FIG. 3.

In another embodiment of the method of storing the stream of digital video information signals, all steps are modified to process a stream of digital video signals complying with the DIF standard as referred to previously in the description.

Figure 5:
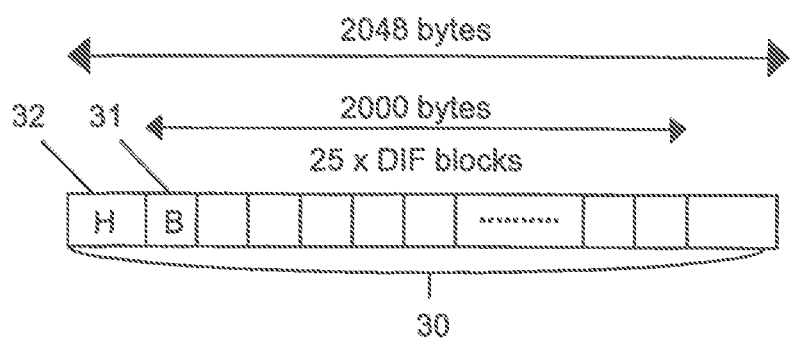
FIG. 5 shows an example of a structure of a logical unit of information with an integer number of data blocks, in accordance with the invention.

Yet another embodiment of the method of storing the stream of digital video information signals can be realized by modifying step 406 so an integer number of the data blocks are allocated to a logical unit, as was explained in reference to FIG. 5.

Step 406 can be modified to provide a logical unit 30 with a logical unit header 32, which may contain a specific information concerning digital video information signals. More specifically, the header 32 may comprise copy protection information 33, e.g. in a form of 2-bits flag, which can be used to prevent unauthorized copying of data stored on the record carrier.

Furthermore, step 406 can be modified to include sub-steps of removing data blocks headers and providing logical unit headers 32 with address information, e.g. for addressing contents of logical units. For example, in case of DIF blocks, 3-bytes block headers (ID in FIG. 4) can be removed. Instead, simple address information comprised in logical unit header 32 may be provided for addressing data blocks.

In another embodiment of the method of storing the stream of digital video information signals, step 406 is modified to allocate data blocks in a manner as was described in reference to FIG. 6.

Whilst the invention has been described with reference to preferred embodiments thereof, it is to be understood that these are not limitative examples. Thus, various modifications may become apparent to those skilled in the art, without departing from the scope of the invention, as defined by the claims. Further, the invention lies in each and every novel feature or combination of features described above. It is noted, that the invention may be implemented by means of a general purpose processor executing a computer program or by dedicated hardware or by a combination of both, and that in this document the word "comprising" does not exclude the presence of other elements or steps than those listed and the word "a" or "an" preceding an element does not exclude the presence of a plurality of such elements, that any reference signs do not limit the scope of the claims, that "means" may be represented by a single item or a plurality and that several "means" may be represented by the same item of hardware.

The invention claimed is:

1. An apparatus for recording a substantially reel time stream of digital video information signals on a disc like record carrier, the stream of digital video information signals representing information arranged in a sequence of video frames, each video frame arranged in separate, consecutive data blocks transmitted in data packets, the data blocks comprising data blocks headers, the disc like record carrier having units of recording of a predetermined size larger than a size of the data packets, the apparatus comprising:
    input means for receiving the stream of digital video information signals;
    processing means for processing the stream of digital video information signals to obtain recordable information signals representing logical units of information;
    writing means for writing the recordable information signals into the units of recording on the disc like record carrier,
and wherein:
    the processing means are adapted to detect the data blocks in the data packet to separate the data blacks from the data packets, to generate allocation information using information comprised in the data blocks headers, to allocate consecutive data blocks comprised in multiple data packets to consecutive logical units of information according to the allocation information, a size of each logical unit of information corresponding to the predetermined size of the unit of recording and the processing means are adapted to allocate a first data block representing a beginning of a video frame comprised in the sequence of video frames to a predefined location in a logical unit of information.

2. The apparatus of claim 1, wherein the processing means are adapted to use the predefined size factor equal to 64-bytes or 128-bytes.

3. The apparatus of claim 1, er in the processing means are adapted to process the stream of digital video information signals complying with the Digital Interface Format.

4. The apparatus of claim 1, wherein the processing means are adapted to allocate an integer number of the data blocks into a logical unit of information.

5. The apparatus of claim 1, wherein the processing means are adapted to provide logical units of information with logical unit headers.

6. The apparatus of claim 5, wherein the processing means are adapted to provide the logical unit headers with copy protection information.

7. The apparatus of claim 5, wherein the processing means are adapted to remove the data blocks headers from the data blocks and to provide the logical unit headers with address information for addressing the data blocks in the logical units of information.

8. An apparatus for reproducing a substantially real time stream of digital video information signals from a disc like record carrier, the stream of digital video information signals representing information arranged in a sequence of video frames, each video time arranged in separate, consecutive data blocks, the disc like record carrier having units of recording of a predetermined size, the apparatus comprising:
   input means for reading information signals representing logical units of information from the units of recording on the disc like record carrier, a size of each logical unit of information corresponding to the predetermined size of the unit of recording;
   processing means for processing the info ion signals to obtain the stream of digital video information signals,
wherein
the processing means are adapted to recover consecutive data blocks comprised in consecutive logical units of information and to form the sequence of video frames and the processing means are adapted to recover a first data block representing a beginning of a video frame comprised in the sequence, the first data block starting at a predefined location in a logical unit of information.

9. The apparatus of claim 8, wherein the processing means are adapted to use the predefined size factor equal to 64-bytes or 128-bytes.

10. The apparatus of claim 8, wherein the processing means are adapted to process the logical units of information representing a stream of digital video signals complying with the Digital Interface Format.

11. The apparatus of claim 8, wherein the processing means are adapted to process the logical units of information, each comprising an integer number of the data blocks.

12. The apparatus of claim 8, wherein the processing means are adapted to recover logical unit headers comprised in the logical units of information.

13. The apparatus of claim 12, wherein the processing means adapted to recover copy protection information comprised in the logical unit headers.

14. The apparatus of claim 12, wherein the processing means are adapted to recover address information for addressing the data blocks in the logical units of information, the address information comprised in the logical unit headers.

15. The apparatus of claim 14, wherein the processing means are adapted to provide the data blocks with data blocks headers using the address information.

16. A method of storing a substantially real time stream of digital video information signals on a disc like record carrier, the stream of digital video information signals representing information arranged in a sequence of video frames, each video frame arranged in separate, consecutive data blocks transmitted in data packets, the data blocks comprising data blocks headers, the disc like record carrier having units of recording of a predetermined size larger than a size of the data packets, the method comprising steps of:
   receiving the stream of digital video information signals;
   detecting the data packets in the stream of digital video information signals;
   detecting the data blocks in the data packets;
   separating the data blocks from the data packets;
   generating allocation information using information comprised in the data blocks headers;
   allocating consecutive data blocks comprised in multiple data packets to consecutive logical units of information according to the allocation information, a size of each logical unit of information corresponding to the predetermined size of the unit of recording;
   allocating a first data block representing a beginning of a video frame comprised in the sequence of video frames to a predefined location in a logical unit of information, the predefined location starting at a position being multiple of a predefined size factor depending on the size of the video frame and the size of each logical unit.

17. The method of claim 16, wherein the predefined size factor equal to 64-bytes or 28-bytes.

18. The method of claim 16, wherein the stream of digital information signals is a stream of digital video signals complying with the Digital Interface Format.

19. The method of claim 16, wherein an integer number of the data blocks are allocated into a logical unit of information.

20. The method of claim 16, characterized by a step of:
   providing logical units of information with logical unit headers.

21. The method of claim 20, characterized by a step of providing the logical unit headers with copy protection information.

22. The method of claim 20, characterized by steps of:
   removing the data blocks headers from the data blocks;
   providing the logical unit headers with address information a for addressing the data blocks in the logical units of information.

23. A record carrier provided with the recordable information signals recorded on it with the method of claim 16.

* * * * *